March 7, 1950
C. F. BRUNDAGE
PHOTOGRAPHIC CAMERA BACK WITH
REMOVABLE COLLAPSIBLE HOOD
2,500,058
Filed June 3, 1947
5 Sheets-Sheet 1
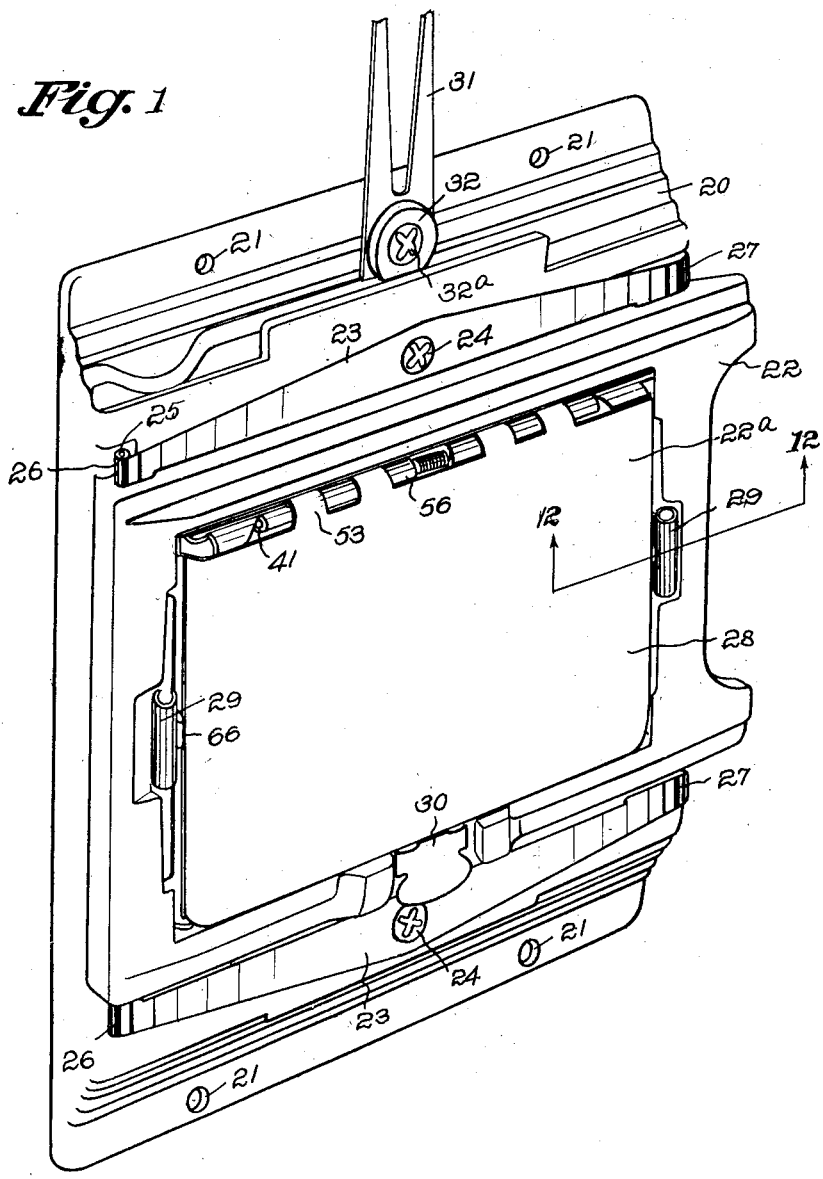
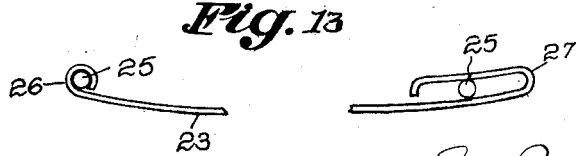
INVENTOR.
CLINTON F. BRUNDAGE
BY
ATTYS March 7, 1950

C. F. BRUNDAGE
PHOTOGRAPHIC CAMERA BACK WITH
REMOVABLE COLLAPSIBLE HOOD 2,500,058

Filed June 3, 1947

INVENTOR.
CLINTON F. BRUNDAGE
BY
ATTYS

March 7, 1950

C. F. BRUNDAGE 2,500,058

PHOTOGRAPHIC CAMERA BACK WITH
REMOVABLE COLLAPSIBLE HOOD

Filed June 3, 1947

INVENTOR.
CLINTON F. BRUNDAGE
BY
ATT'YS

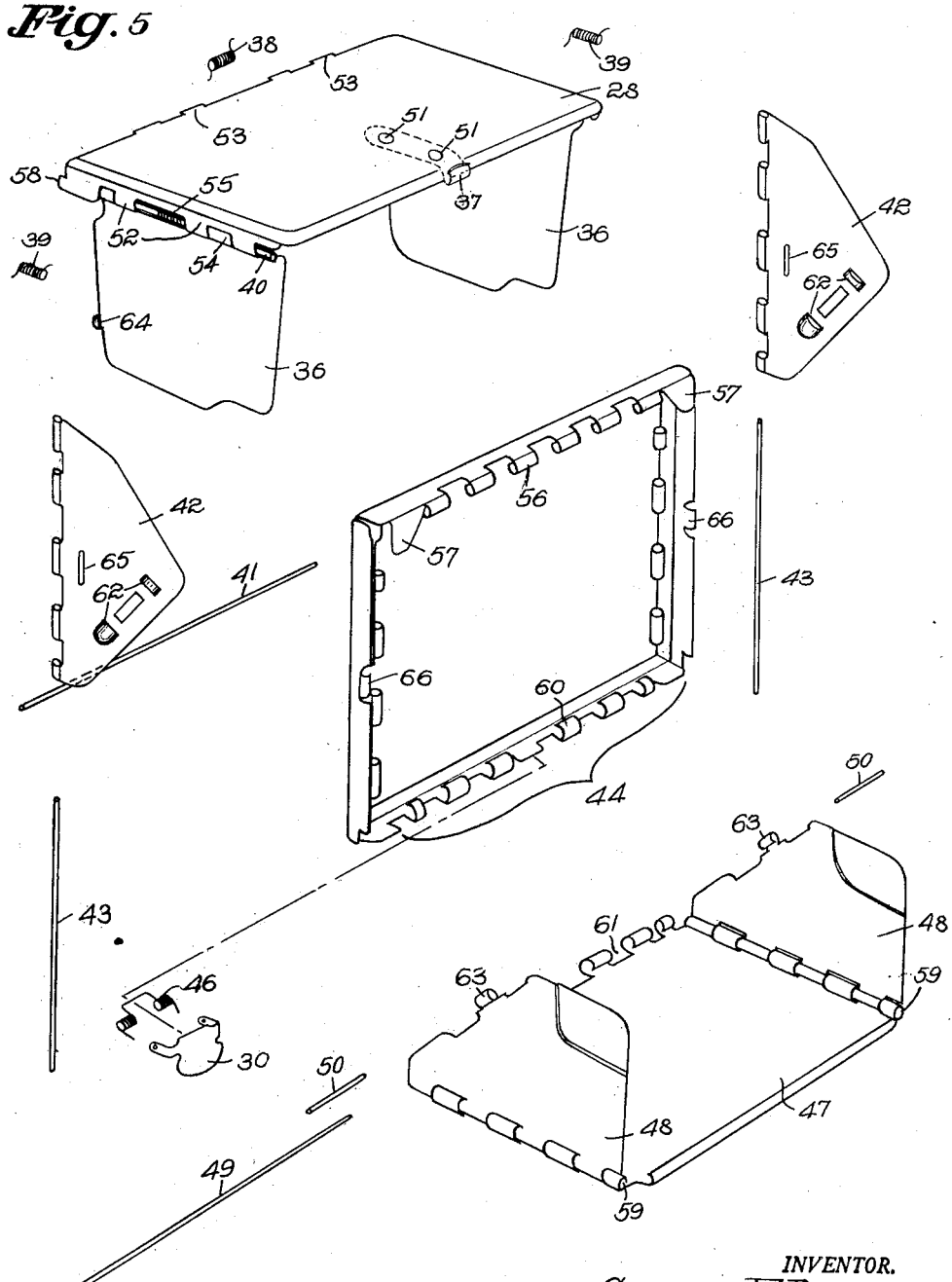

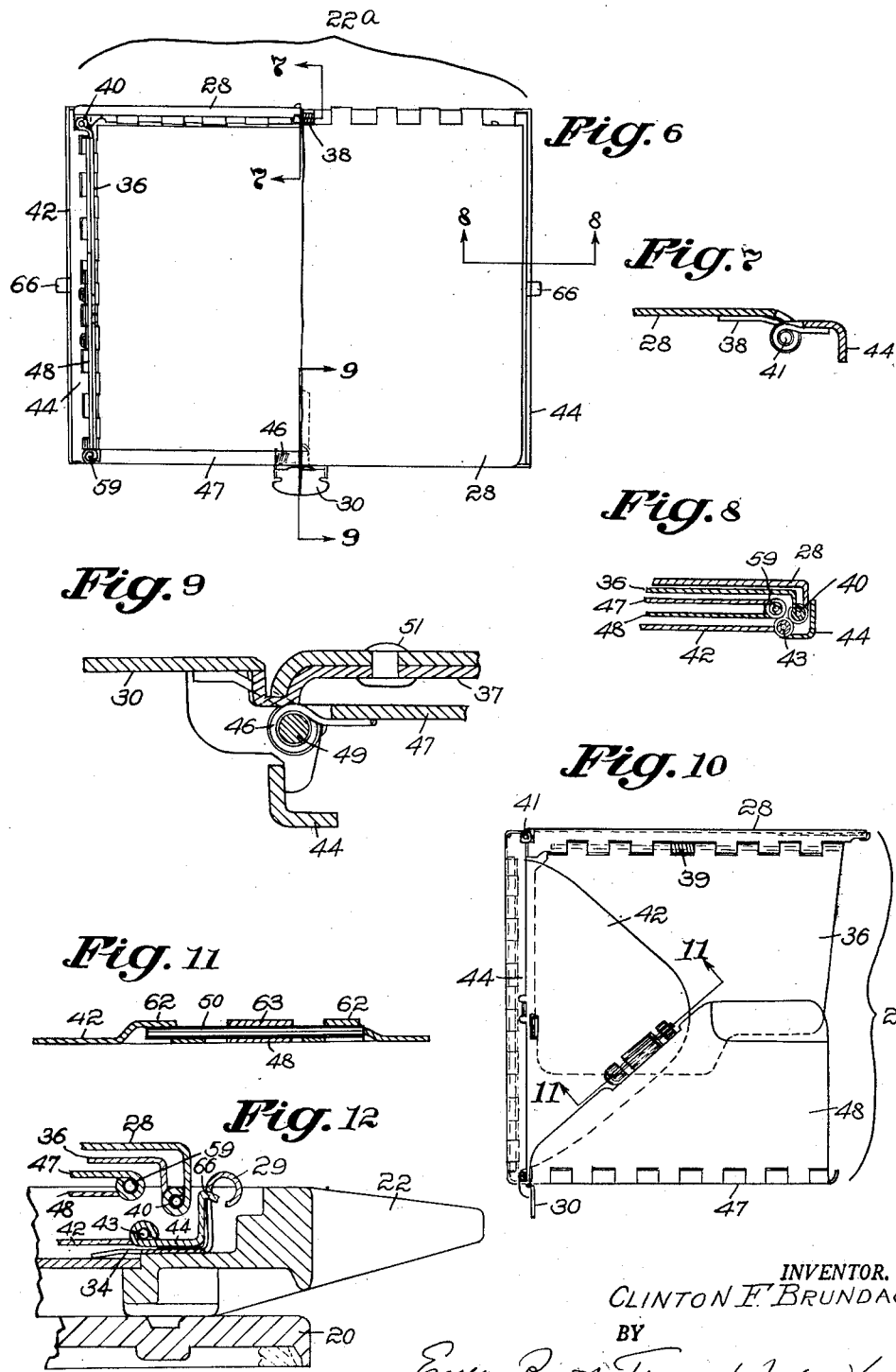

Patented Mar. 7, 1950

2,500,058

UNITED STATES PATENT OFFICE 2,500,058

PHOTOGRAPHIC CAMERA BACK WITH REMOVABLE COLLAPSIBLE HOOD

Clinton F. Brundage, Macedon, N. Y., assignor to Graflex, Inc., Rochester, N. Y., a corporation of Delaware Application June 3, 1947, Serial No. 752,185

7 Claims. (Cl. 95—47)

1

This invention relates to a new back with collapsible hood for photographic cameras and particularly of the type commonly known as press cameras or folding cameras.

In order that the principle of the invention may be readily understood, I have disclosed a single embodiment thereof in the accompanying drawings, wherein Fig. 1 is an isometric plan view of the camera back having the hood in the folded or collapsed condition;

Fig. 5 is an isometric exploded view clearly showing the structure and arrangement of all the parts of the collapsible hood;

Fig. 6 is an elevation of the collapsible hood removed from the camera, part of the cover being cut away to show more clearly the construction thereof;

Fig. 7 is a fragmentary section of Fig. 6 taken on the line 7—7 thereof, with the hood in its open condition;

Fig. 8 is a fragmentary section through Fig. 6 on the line 8—8 thereof, showing the arrangement of the parts when the hood is in its folded condition;

Fig. 9 is a section through Fig. 6 on the line 9—9 thereof, to show more clearly the structure of the hood latch;

Fig. 10 is a side elevation of the hood in its open or extended condition;

Fig. 11 is a section through Fig. 10 taken on the line 11—11 thereof, clearly showing the structure of one of the hinged side members;

Fig. 12 is a fragmentary section through Fig. 1 taken on the line 12—12 thereof, to show clearly the position and arrangement of the hood structure in relation to the camera back; and Fig. 13 is a detail partly broken away, showing the construction of one of the back spring members.

Objects of this invention are to provide a camera back having a collapsible hood for shading the ground glass screen of the camera back; to

2 provide a camera back with a self-erecting folding hood; to provide a camera back wherein the folding hood can readily be removed from the camera back; and to provide a camera back having a hood structure that is simple in construction and yet is a very rugged structure so as to absorb the unusual punishment that these cameras inevitably get in use. Other important objects of this invention will be apparent from the following detailed description.

Figure 2:
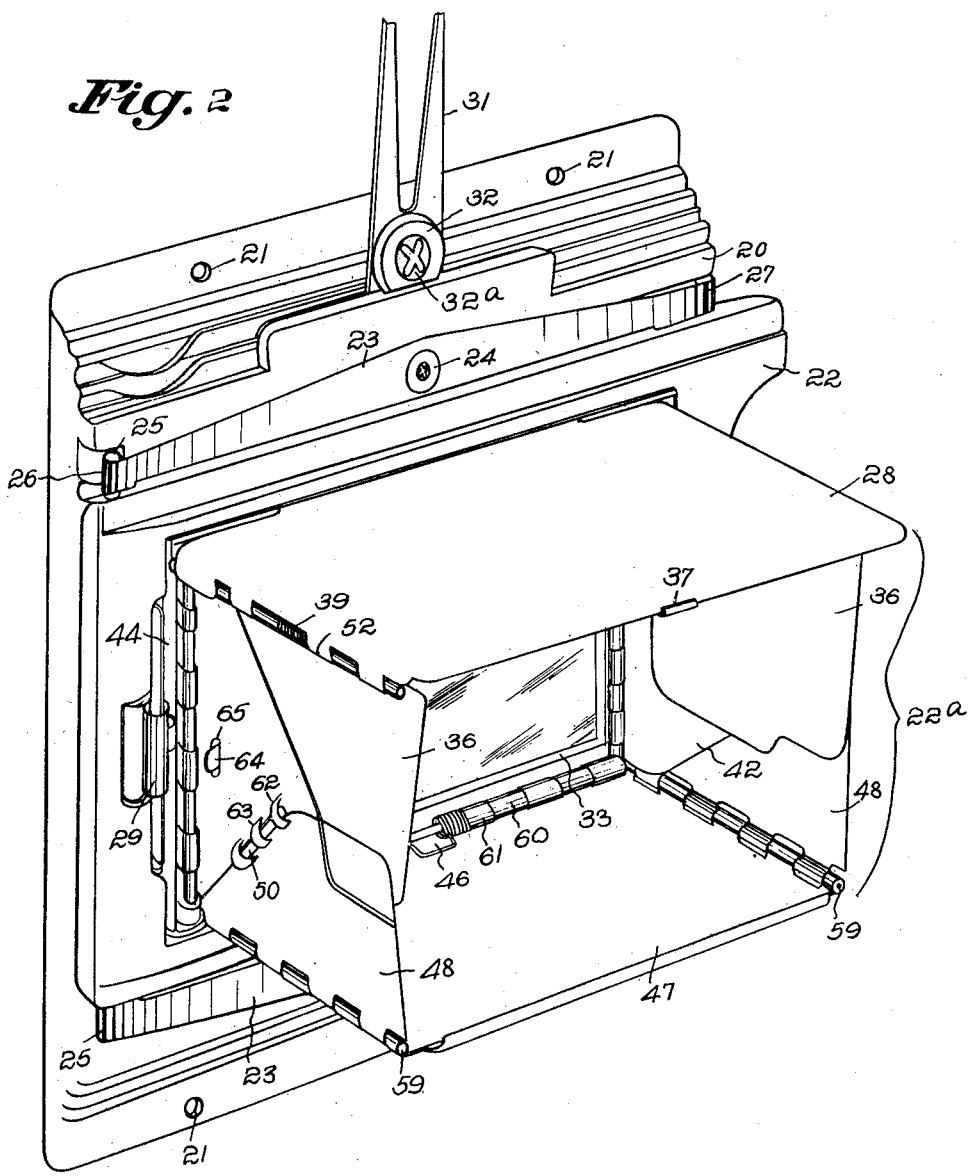
Fig. 2 is a view similar to Fig. 1, but with the hood in the open or extended position.

Referring to Fig. 1, a casting preferably of metal is shown at 20, which constitutes the back frame of the camera and which is held to the camera back by means of screws passing through holes 21, 21 therein. To the camera back 20 is attached a focusing screen support member or frame 22, for the hood assembly 22a, by means of springs 23, 23, one of which is shown separately in Fig. 13 and which springs are attached to the camera back 20 by means of screws 24, 24. The outer ends of the springs 23 are attached to the said focusing screen support member 22 by pins 25, there being a pin 25 for each end of each of the springs 23, but one pin only is shown, excepting in Fig. 13. The left-hand ends of the springs 23 are bent to form a closed coil indicated at 26 that provides a snug fit about the respective pins 25. The right-hand ends of the springs 23 are bent to provide an elongated loop 27, most clearly shown in detail in Fig. 13. This structure permits the focusing screen support member or frame 22 to be pivoted on the left-hand pins 25, and it can be swung sufficiently in an outward direction because of the lost motion provided by the loop formations 27. A cover member 27 is provided, as shown in Figs. 1, 2 and 5, and has hinge formations subsequently described.

The focusing screen support member 22 is held in such position that the ground glass lies at the focal plane for focusing purposes and yields to allow a film holder or a pack adapter or other sensitized surface holder to be inserted in the camera between the camera back 20 and the said focusing screen support member 22. The loop formation 27 on each spring 23 allows such spring to flex, since the spring tends to shorten as said frame 22 is moved backward while inserting a sensitized surface holder, due to the arc assumed by such spring 23. If a closed eye, such as 26, were used instead of the loop formation 27, it would be practically impossible to force the focusing screen support member 22 away from the back frame 20 of the camera a sufficient distance to allow the insertion of the sensitized surface holder. The distance through which each spring 23 moves is just sufficient to allow space for the insertion of such sensitized surface holder.

Fitted into the focusing screen support member 22 is the hood assembly indicated generally at 22a in Figs. 1, 2, 6 and 10. The hood assembly 22a has the cover 28 and is held to the focusing screen support member 22 by means of two spring clips or latch members 29, 29, to be subsequently more fully described. The hood assembly 22a is provided with a latching member or hood latch 30, Figs. 1, 5, 6 and 10, that holds the hood assembly in a closed condition. A hinged member 31 constitutes a rear sight for the usual wire frame view finder, and is held to the camera back 20 by means of a washer 32 and a screw 32a.

Figure 3:
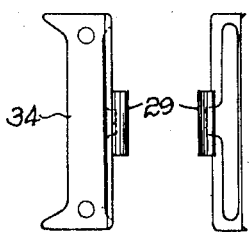
Fig. 3 is a detail of the ground glass screen-retaining strip and the hood-retaining latch.
Figure 4:
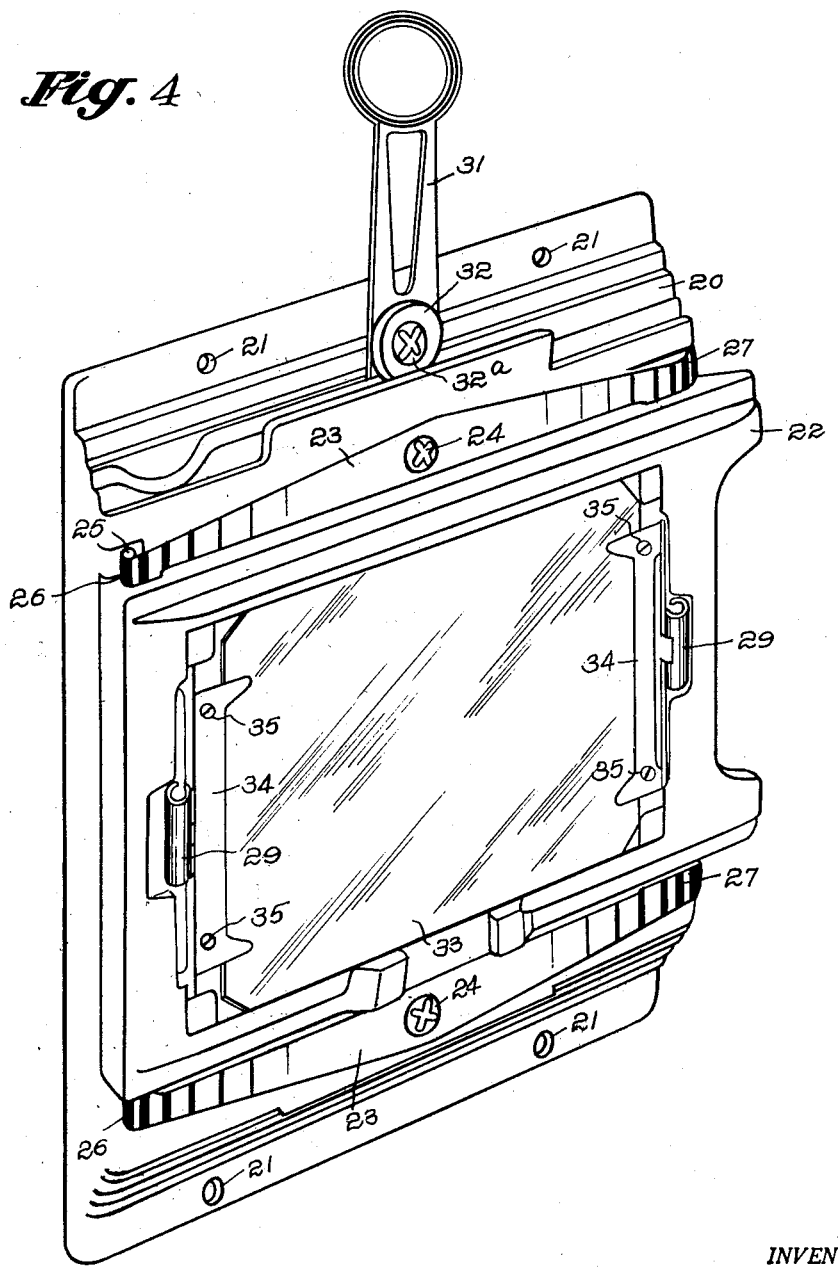
Fig. 4 is a view similar to Fig. 1, but with the hood entirely removed to expose the ground glass screen.

In Fig. 4, the camera back is represented with the hood assembly entirely removed, so as to show the ground glass screen 33, which is held to the focusing screen support member 22 by means of clips 34, 34 that are secured to the focusing screen support member 22 by means of screws 35, 35. Each ground glass retaining clip 34 and companion hood retaining clip member 29 is manufactured as one integral unit, as best illustrated in Fig. 3.

In Fig. 5 is shown an exploded view of the collapsible hood that is made up of the cover member 28, the upper side plates or flaps 36, the latch plate 37, the upper spring 38, the side springs 39, the upper side-flap-hinge pins 40, the cover hinge pin 41, the intermediate side plates 42, the intermediate side plate-hinge pins 43, the hood frame indicated generally at 44, the cover latch 30 previously referred to, the cover latch spring 46, the lower or bottom hinged plate 47, the lower side hinged plates 48, 48, the lower hinged plate hinge pin 49 and the side plate hinge pins 50.

The hood is assembled as follows: The latch plate 37 is secured to the cover by rivets 51, 51. The cover 28 is also provided with hinge-like formations on either side, indicated at 52. The hinge formation is also formed at the back edge of the cover member 28, as indicated at 53. The side plates 36, 36 also have hinge formations indicated at 54. The said side plates 36 are assembled or connected to the cover 28 by inserting the hinge pins 40. In a space provided therefor and indicated at 55 is fitted one of the coiled springs 39, which two springs are so formed as to cause the side plates 36 to swing in an outward direction. The hood frame, indicated generally at 44, is provided with hinge members or formations on its four sides. The hinge member or formation 56 becomes part of the hinge, supporting the cover member 28, when the pin 41 is inserted. The spring 38 is fitted to the hinge pin 41 and the said spring is so formed to cause the cover 28 to swing in an upward direction to the position shown in Fig. 2.

The cover member 28 is prevented from swinging beyond a 90° position by stops 57 on the hood frame 44 through the engagement of hooks 58 formed integral with the cover 28. To the left-hand side of the hood frame 44 is assembled the side plate 42 and it is held thereto by the pin 43. A similar plate 42 is also assembled or connected to the right-hand side of the hood frame 44 in a like manner. Assembled or connected to the bottom plate 47 are the lower side plates 48, 48 having suitable hinge formations. The bottom plate 47 also has mating hinge formations. The plates 48, 48 are held to the bottom plate 47 by hinge pins 59, 59. The bottom plate 47 is also connected or assembled to the lower edge of the hood frame 44 which is provided with suitable hinge formations 60, and the said bottom plate 47 has hinge formations 61. When the said hinge formations are engaged, the bottom plate 47 is held to the plate 44 by the hinge pin 49.

Also fitted over the hinge pin 49 are the cover release latch 30 and the spring 46. The assembly position of the spring 46 is best shown in Fig. 9. The said spring 46 causes the bottom plate 47 to be swung in an outward direction. The side plates 42 and the lower side plates 48 are also provided with hinge formations indicated at 62 and 63 respectively. When the hood is assembled, the plates 42 and 48 are pivoted together by the hinge pins 50. The upper side plates 36 are provided with fingers 64, 64 that engage elongated openings 65, 65 in the side plates 42 when the cover member 28 is in the fully open condition. This locks the assembly in open condition until the side members 36, 42 and 48 are pressed inwardly, thus withdrawing the projection 64 from the slot 65 permitting the hood to be collapsed.

When the hood assembly is in a fully collapsed condition as in Fig. 1, the latch plate 37, Figs. 5 and 9, is engaged by projection of the latch 30, which is caused to rotate in a clockwise direction, viewing Fig. 9, so as to cause the said projection of the latch 30 to overlie the upturned end of the latch plate 37, thus holding the cover member 28 in a collapsed or closed condition. A slight pressure on the latch 30 in a downward direction, viewing Fig. 9, will disengage the projecting end of the latch 30 from the latch plate 37. The springs 38, 39 and 46 will cause the hood automatically to spring to the open condition shown in Figs. 2 and 10.

The hood assembly is held to the focusing screen support member 22 by the clip members, 29, 29, engaging projections 66, 66, Figs. 1, 5 and 6, which are integral with the hood frame 44. With the hood assembly in its folded condition, it is simply slipped in position in a suitable opening of the focusing screen support member 22 until the said projections 66 are engaged by the clip members 29. To remove the hood, pressure in an outward direction on either clip member 29 will allow the hood assembly to be readily and very quickly removed.

A brief resume of my invention is as follows. Referring to Fig. 1, therein is shown the camera back complete with the hood assembly in place and in collapsed condition. Pressure upon the hood latching member 30 will allow the focusing hood to spring into its open condition, shown in Fig. 2. The cover member 28 will be in a horizontal position in respect to the camera, as will also be the bottom plate 47. The side plates or flaps 36 and the plates 42 and 48 will complete an open box formation, and the openings 65 in the side plates 42 will be engaged by the projections 64 of the side plates 36, thus preventing the closing or collapsing of the hood unless pressure is applied to the sides thereof.

To close the hood, it is only necessary to compress with the fingers the sides thereof, made up of the plates or flaps 36 and the plates 42 and 48, thus closing the lower or bottom plate 47, followed by the cover member 28, and the latch plate 37 will then be engaged by latching member or hood latch 30, holding it in a fully closed condition.

At frequent intervals, it is desirable completely to remove the focusing screen hood assembly to permit the use of a large magnifying glass at the extreme corners of the focusing screen for viewing an image during focusing. This is readily accomplished by merely depressing one of the latch members 29 and lifting out the entire hood assembly.

I have disclosed in this invention a novel focusing hood for use on certain types of folding cameras, which hood is of simple construction, is simple to manufacture and is completely foolproof in operation. At the same time, the entire assembly is readily removable from the camera for certain types of work and can almost instantly be replaced. When removed, it forms a small compact package that is entirely self-contained and that can be slipped into a narrow space in the camera carrying case or into the operator's pocket.

I am familiar with the prior art constructions of focusing hoods and believe that by this invention I have overcome all the disadvantages of the prior art. Moreover, I believe I am the first to provide a readily removable self-contained focusing hood that can instantly be installed or removed without the use of any tools.

I am fully aware of the hood construction disclosed in the patent to Louis D. Nadel No. 2,293,427, August 18, 1942, belonging to the same assignee as does this application, and from which my invention is distinguished as set forth in the following claims.

Having thus described one illustrative embodiment of the invention, it is to be understood that although specific terms are employed, they are used in a generic and descriptive sense and not for purposes of limitation, the scope of the invention being set forth in the following claims.

I claim:

1. A focusing hood assembly for a photographic camera comprising a substantially rectangular frame, side plate respectively hinged to the two sides of said frame, and a cover and a bottom plate respectively hinged to upper and lower sides of said frame, so as to be folded flatwise with respect to each other and to the said frame, and side plates respectively hinged to opposite ends of said cover and adapted to be folded flatwise with respect thereto, and lower side plates respectively hinged to opposite ends of said bottom plate and adapted to be folded flatwise with respect thereto.

2. A focusing hood assembly for a photographic camera comprising a rectangular frame attachable to the camera back, and hood flaps separate and distinct from each other, pivotally connected along an edge respectively thereof to the four sides of said rectangular frame, so as to be foldable down flatwise or erected into focusing position, two flaps which are at two opposite sides of the said rectangular frame, each having two auxiliary flaps pivoted respectively to outer edges of said two flaps and adapted themselves to be folded down flatwise and to be erected into focusing position.

3. A focusing hood assembly for a photographic camera comprising a rectangular frame attachable to the camera back, and hood flaps separate and distinct from each other, pivotally connected along an edge respectively thereof to the four sides of said rectangular frame, so as to be foldable down flatwise or erected into focusing position, two flaps which are at two opposite sides of the said rectangular frame, each having two auxiliary flaps pivoted respectively to outer edges of said two flaps and adapted themselves to be folded down flatwise and to be erected into focusing position, said auxiliary flaps each having a projecting formation 64 and the next adjacent separate flap having an opening 65 to be engaged by the corresponding formation 64 when the hood assembly is in erected, focusing position.

4. A focusing hood assembly for a photographic camera comprising a rectangular frame attachable to the camera back, and hood flaps separate and distinct from each other, pivotally connected along an edge respectively thereof to the four sides of said rectangular frame, so as to be foldable down flatwise or erected into focusing position, two opposite auxiliary flaps pivoted respectively to the outer edges of one of said four flaps, and a pivotal connection between each of said two auxiliary flaps and the next flap adjacent thereto that is directly pivoted to an edge of the said rectangular frame.

5. A focusing hood assembly for a photographic camera comprising a rectangular frame attachable to the camera back, and hood flaps separate and distinct from each other, pivotally connected along an edge respectively thereof to the four sides of said rectangular frame, so as to be foldable down flatwise or erected into focusing position, and thus providing a top or cover flap, a bottom flap and two side flaps, two opposite auxiliary flaps pivoted respectively to the outer edges of the bottom flap, and a pivotal connection between each of said two auxiliary flaps and the side flap that is next adjacent thereto.

6. A focusing hood assembly for a photographic camera comprising a rectangular frame attachable to the camera back, and hood flaps separate and distinct from each other, pivotally connected along an edge respectively thereof to at least three sides of said rectangular frame, so as to be foldable down flatwise or erected into focusing position, one of the said flaps having two auxiliary flaps pivoted respectively to the opposite side edges of said flap, and adapted to be folded flatwise and to be erected into focusing position, said auxiliary flaps each having a projecting formation 64 and the next adjacent separate flap having an opening 65 to be engaged by the corresponding formation 64 when the hood assembly is in erected, focusing position.

7. A focusing hood assembly for a photographic camera comprising a rectangular, open frame 44 having means at edges thereof for readily, toollessly, detachably connecting the same to the camera back, the said frame 44 having along each of the four edges thereof hinge formations, a cover-flap plate-member and a bottom-flap plate-member each having hinge formations along its inner edge mating with hinge formations upon the top and bottom edges of said rectangular frame, two side plate flaps 42 each having hinge formations along the inner upright edge thereof, mating with hinge formations along the said side edges of said frame 44, the said cover-flap plate-member having hinge formations along the two opposite side edges thereof, two upper side flaps 36 having along the upper edges hinge formations respectively mating with those of the cover-flap member, the bottom-flap plate-member having hinge formations along the two opposite side edges thereof, and two lower side flap plates having at their lower edges hinge formations respectively mating with those of the bottom-flap plate-member.

CLINTON F. BRUNDAGE.

REFERENCES CITED

The following references are of record in the file of this patent:

UNITED STATES PATENTS

| Number | Name | Date |
|---|---|---|
| 129,104 | Clinedinst | July 16, 1872 |
| 387,092 | Mann | July 31, 1888 |
| 427,321 | Hein | May 6, 1890 |
| 606,394 | Sharretts | June 28, 1898 |
| 720,900 | Dorr | Feb. 17, 1903 |
| 818,136 | Woodall | Apr. 17, 1906 |
| 1,121,178 | Freud | Dec. 15, 1914 |
| 1,143,045 | Freud | June 15, 1915 |
| 1,217,728 | Ehrlich | Feb. 27, 1917 |
| 1,263,684 | Leach | Apr. 23, 1918 |
| 1,525,768 | Christie | Feb. 10, 1925 |
| 1,675,598 | Chetteville | July 3, 1928 |
| 1,724,089 | Hook | Aug. 13, 1929 |
| 2,200,007 | Mihalyi | May 7, 1940 |
| 2,252,640 | Nichterlein | Aug. 12, 1941 |
| 2,293,427 | Nadel | Aug. 18, 1942 |
| 2,294,445 | Bressler | Sept. 1, 1942 |
| 2,305,665 | Bolsey | Dec. 22, 1942 |

FOREIGN PATENTS

| Number | Country | Date |
|---|---|---|
| 13,603 | Great Britain | of 1897 |
| 447,742 | Great Britain | Feb. 27, 1935 |